Patented Oct. 24, 1939

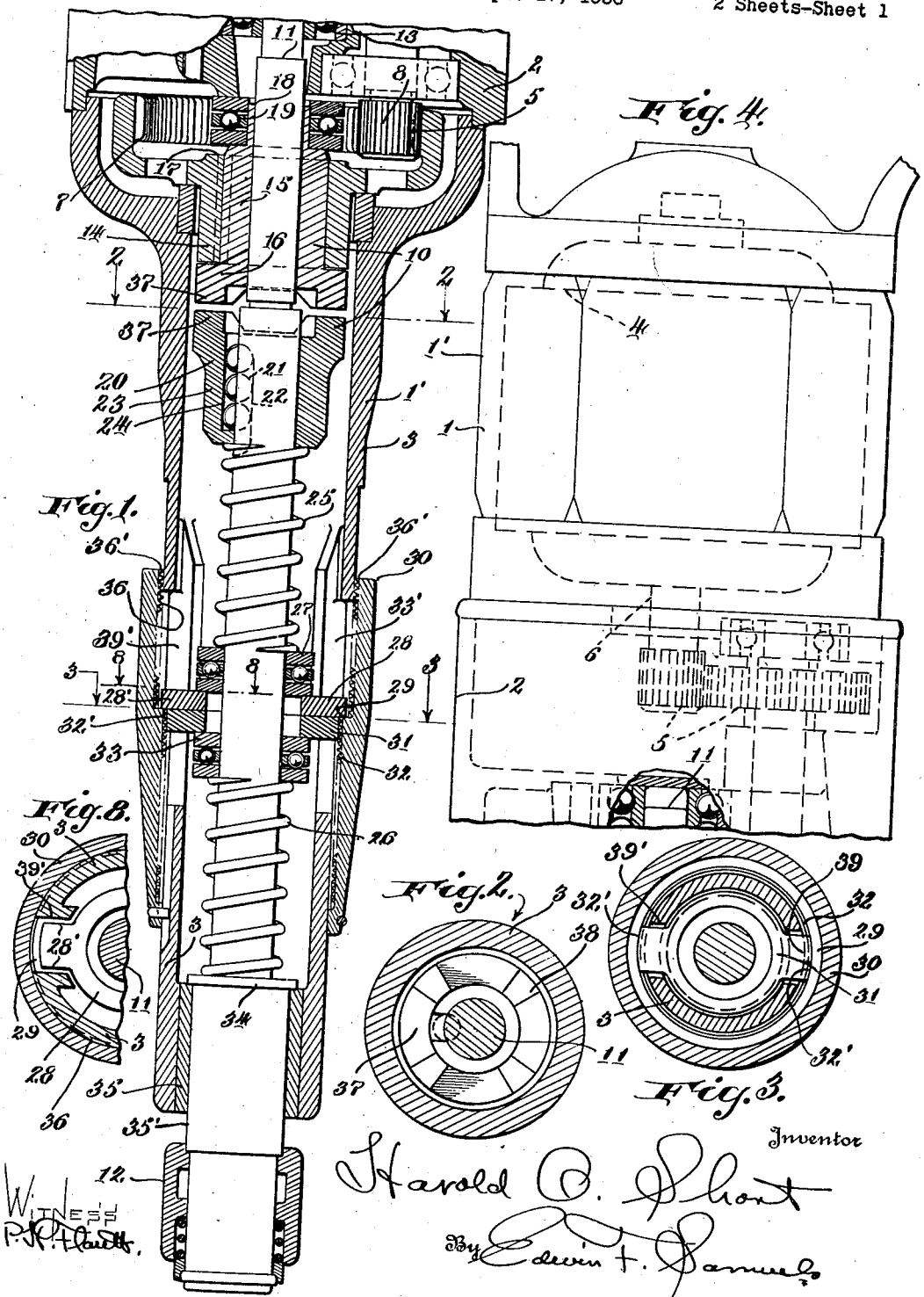

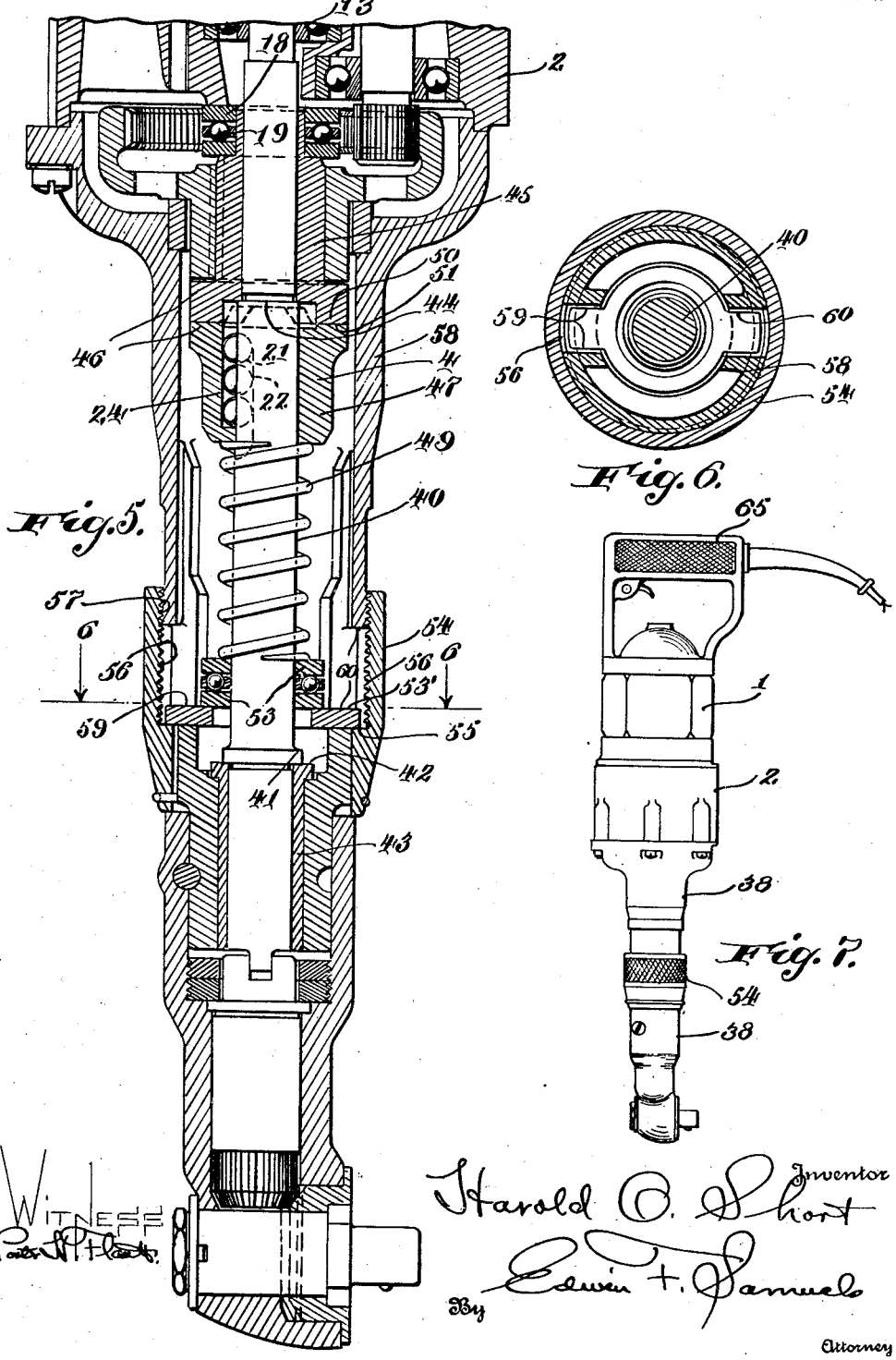
Oct. 24, 1939. H. O. SHORT 2,176,928
SCREW DRIVER AND NUT RUNNER OVERLOAD RELEASE
Filed Sept. 17, 1936  2 Sheets-Sheet 2

2,176,928

UNITED STATES PATENT OFFICE 2,176,928

SCREW DRIVER AND NUT RUNNER OVERLOAD RELEASE

Harold O. Short, Baltimore, Md., assignor to The Black & Decker Manufacturing Company, a corporation of Maryland Application September 17, 1936, Serial No. 101,224

7 Claims. (Cl. 81—54)

The invention relates to manually portable power driven rotary tools and more particularly to the type of tool used for driving screws and running nuts, so that it is referred to as a screw driver or wrench.

The invention in the preferred form provides a clutch which serves the combined features of overload release and dead spindle, the latter phrase being used to signify that the spindle is normally released from its connection to the motor so that it may be turned to any convenient angle for engagement with the work, the clutch being engaged by pressure of the tool against the work. An important feature of the clutch in the preferred form is a balanced spring control comprising two opposed balanced springs, one of which holds the clutch normally released providing the dead spindle feature and the other of which springs holds the clutch in engagement while the tool is pressed against the work, until the torque increases up to the point of overload release whereby the torque applied to the work is automatically determined. In this combined arrangement as well as in the form lacking the dead spindle feature the overload releasing spring abuts against the frame or a support thereon causing the clutch vibration to be taken up by the frame relieving the hands of the operator of its harmful effect.

A feature of importance in connection with this form is an adjustment of the overload release spring to vary the torque applied to the work to give a predetermined limiting torque at which the nuts, screws and bolts are to be set.
This adjustment is so devised as to maintain the balance of the springs as the torque at which release takes place is adjusted.

The invention also relates to a tool which may be provided with a right angle drive and which for this purpose has been shown without the dead spindle feature but including the adjustment. This arrangement may be otherwise utilized.

An important feature of both forms is that the overload release takes place without the transmission of any vibration longitudinally of the tool to the operator. Preferably the moving clutch member is mounted to slide on the spindle which does not move in the direction of its axis in the overload releasing operation though in the first form having the balanced spring it is shown as moving in an axial direction for the purpose of the dead spindle operation. To avoid vibration of the tool in the direction of the thrust by which the tool is applied to the work, the motion of the moving clutch member takes place relatively to the shaft or spindle and is transmitted to the overload release spring. The varying tension of this spring is in turn transmitted to the tool frame by way of an abutment or thrust member and absorbed through and by way of the frame or casing without effect on the hands of the operator.

In drawings I have illustrated so much of a manually portable electrically driven screw driver and/or wrench in two forms, one being an axial drive and the other being a right angle drive as is necessary to a full understanding of the invention. In the drawings:

Figure 1 is a fragmentary section, on a plane of the axis, of the preferred form of the tool, showing the gear drive from the motor, the spindle, the spindle housing, the clutch mechanism and the torque adjustment.

Figure 2 is a section on a plane at right angles to the axis determined by the line 2—2 in Fig. 1.

Figure 3 is a section on a plane at right angles to the axis located by the line 3—3 in Fig. 1.

Figure 4 is a fragmentary elevation of the upper portion of the tool particularly the motor housing, the same being continuous with Fig. 1, and partly in section on the same plane.

Figure 5 is a section similar to Fig. 1, showing a modified form of the tool having a right angle drive.

Figure 6 is a section on a plane at right angles to the axis located by the line 6—6 in Figure 5.

Figure 7 is external view of the tool.

Figure 8 is a fragmentary section on line 8—8, Fig. 1.

Referring to the drawings by numerals, each of which is used to indicate the same or similar parts in the different figures, the tool, which is capable of considerable variation, without departure from the invention, comprises a tool casing, which consists of three sections, a motor housing or casing 1, gear casing 2 and spindle housing 3, which together comprise the tool casing 1' as a whole, which also serves as the frame of the tool. Within the casing is an electric motor 4 which is the source of power and reducing gear train 5 connecting the motor shaft 6 to the clutch drive gear 7 which is shown as a cup like, internal gear which meshes with a pinion 8, the gear and pinion being at the end of said train of reducing gears.

The overload release clutch 10 which in this instance also serves as a dead spindle clutch is concentric with the tool spindle 11 which as shown passes through the clutch. The spindle is mounted in suitable bearings 13 at the top in the gear casing and at the bottom at 35 in the lower end of the spindle housing. A tool chuck 12 is mounted on the lower end of the spindle.

The clutch drive gear 7 in the preferred form of tool shown is provided with a depending hub 14 which is tubular and carries within the tubular portion the hub 15 of the upper clutch member 16. This is secured to the hub 15 by a key 17. The clutch hub has a reduced portion at its upper end at 18 which is mounted in and positioned by a thrust bearing 19 suitably supported in the gear casing, so that the upper clutch member is supported against upward thrust. The lower clutch member 20 is keyed to the spindle by means of balls 21 which are seated in registering grooves 22 and 24 in the hub 23 of the clutch member and in the spindle respectively, the groove 24 in the spindle being elongated beyond the balls to provide for the sliding of the clutch member 20 along the spindle in the overload releasing operation. The clutch has teeth 37 with inclined contacting surfaces 38 giving them a releasing tendency which increases with the torque transmitted by the clutch.

The clutch member 20 is shown in normal, i. e. released, position to which it is moved by the dead spindle spring 26 when the tool is not in operation or in contact with the work. The operation of the clutch in the form of the invention, Fig. 1, is controlled by two springs which as combined balance each other. These springs comprise the overload release spring 25 and the dead spindle spring 26. The overload release spring 25 bears at one end against the bottom surface of the sliding clutch member 20 or applies a closing tendency to the same in any suitable manner, and at the other end it bears against an abutment shown in the form of a thrust bearing 27, the spring 25 being compressed between the clutch member 20 and abutment 27 and wound in helical form about the spindle 11.

The abutment or thrust bearing 27, as shown, is supported upon a carrier 28 which in turn rests upon an upwardly disposed internal peripheral shoulder 29 supported on the spindle housing 3 and for purposes of adjustment formed on the inside of the adjusting sleeve 30 which is adjustable along the spindle housing. Immediately below said collar 28 is a dead spindle spring adjusting member shown in the form of an externally threaded traveller 31 engaging internal threads 32 formed on the inside of the adjusting sleeve 30. Bearing against the under side of said carrier 31 and positioned thereby is a second thrust bearing abutment 33. The dead spindle spring 26 is helically wound about the spindle below said thrust bearing 33 being compressed between said thrust bearing 33 and a peripheral flange or shoulder 34 on the spindle and spaced below said latter thrust bearing. In the open position of the clutch, the flange or shoulder 34 rests on the lower spindle bearing 35. which bearing 35 is engaged by the elongated rotary and slide bearing surface 35' on the spindle.

For adjustment of the torque at which the tool releases, the adjusting sleeve 30 and its cooperating parts have been provided. To this end, the sleeve is internally threaded at 36 at its upper end where it engages a corresponding thread 36' on the spindle housing. Threads 36—36' are preferably of one-half the pitch of the thread 32—32' on the carrier 31 and on the inside of the housing below the shoulder 29. To prevent rotation of the carrier 28 and the traveller 31, the carrier 28 is provided with radially projecting ears 28' and traveller 31 with ears 39 which extend outwardly through slots 39' in the housing, the threads 32' being formed on the ends of said ears 39.

It will be understood that when it is desired to adjust the torque at which the tool releases, the sleeve 30 is manually engaged and rotated about the spindle housing 3. When adjusting sleeve 30 is thus rotated there is an equal compression or equal expansion of the springs 25 and 26. The relation stated between threads 36—36', and 32—32' maintains the balance of the springs previously referred to.

If it be assumed that the sleeve 30 be rotated to move it upwardly in Figure 1, it is obvious that the spring 25 would be compressed to the extent of this motion. If the traveler 31 were secured to the sleeve 30 to move with it, the spring 26 would be expanded or relaxed to the same extent that the spring 25 is compressed. To equalize the compression of the springs, it is necessary that the traveler 31 be moved downwardly to the same extent that the member 28, which is carried directly by the sleeve 30 is moved upwardly. If the threads 36 and 32 were of equal pitch, the traveler 31 would remain stationary as the member 30 is moved upwardly, and by making the thread 32 twice the pitch of the thread 36, the member 31 is moved downwardly to the same extent that the member 28 is moved upwardly, giving the desired result. The member 31 is held against rotation by engagement with the slots 39' as shown in Figure 3 and, the threads being inclined in the same direction— one being twice the pitch of the other as already described, the member 31 moves downwardly at the same speed as and simultaneously with the upward motion of the sleeve 30 and the member 28, giving equal and simultaneous adjustment of both springs.

The balance of the springs is such that by downward pressure on the shoulder or flange 34 on the spindle and the bearing of balls 21 against the opposite ends of grooves 22—24, the spring 26 maintains the clutch normally released. But, when the tool is pressed against the work, the spindle slides upwardly until the clutch member 20 is brought by spring 25 into engagement with the clutch 16. When the clutch is thus engaged and the motor is energized, the spindle is rotated until the screw or nut is set and an excess resistance over that for which the torque release is set is encountered. At this time, the pressure of the laterally inclined faces of the teeth of the respective clutch members 16 and 20 upon each other compresses the spring 25 providing the overload releasing action previously referred to. When the pressure by which the tool is applied to the work is released, the spring 26 again expands, holding the clutch in the normally released position in which it is shown in Fig. 1.

It is important to note that in the operation of the overload release even if the tool be held in engagement and permitted or caused to "ratchet over", no vibration is transmitted to the operator and there is in fact no vibration of the casing and handle or grip 65, the vibrations of the clutch member 20 being entirely taken up and absorbed by the casing which supports spring abutment 27 and by the spring itself.

Fig. 2 shows the teeth 37 with their inclined faces 38. Fig. 3 shows the thread 32 within the adjusting sleeve 30 and particularly the adjusting traveller 31 provided with ears 39 the ends of which are threaded. These threads 32' engage the threads 32 within the sleeve.

The second form of overload release illustrated in Figures 5, 6 and 7 is combined with and particularly adapted for use with a tool having the right angle drive. This is intended for use in small and confined spaces where there is not room for the full height of the tool directly over the work. Under these circumstances, the dead spindle feature is not used because it is not adapted for operation in the direction of the tool axis without making the tool too complicated for manufacturing and service efficiency and the dead spindle feature placed in the right angle head is often difficult of operation. For these reasons the dead spindle feature is not present in the second form as shown, though it may be supplied in the right angle head within the field contemplated by the invention.

The construction shown in Figures 5 to 7 is practically identical with that just described except as to the omission of the dead spindle releasing spring 26 and the parts cooperating herewith to effect the normal release of the clutch 10.

The construction shown in Figures 5 to 7 comprises as distinguished from the disclosure of Figures 1 to 4, a spindle 40 rotatively mounted in suitable bearings as shown and held against downward motion by the engagement of a flange 41 thereon with the top surface 42 of the lower spindle bearing 43, and against upward motion by the engagement of shoulder 44 on the spindle with the lower surface of the non-sliding upper clutch member 45 of the overload releasing clutch 46, the thrust of which is taken up by thrust bearings as in the form, Figure 1.

In accordance with the invention, the lower member 47 of clutch 46 which is keyed as in the previous example is mounted on the spindle 40 to slide in the direction of the length of the spindle and is held normally in engagement by means of overload releasing spring 49.

The teeth 50 and 51 of clutch members 45 and 47 are formed with their lateral surfaces inclined as in the construction previously described so that with a predetermined overload they back off, compressing spring 49 releasing the clutch.

For this purpose spring 49, which, as shown, is wound helically around spindle 40 is compressed between the lower sliding clutch member 47 and the thrust bearing 53 through which the spindle extends. This thrust bearing serves as an abutment and is supported on the casing by means of adjusting sleeve 54. For the purpose of adjustment the thrust bearing 53 rests on the carrier 53' which in turn is supported on an internal shoulder 55 in the adjusting sleeve 54. The bottom i. e. the minimum torque adjustment is shown. Above this shoulder the sleeve 54 is internally threaded at 56 for engagement with a thread 57 on the outside of the housing 58.

The carrier 53' is shaped similarly to member 28 Figure 1 and similarly held against rotation, i. e. it has radial arms 59 which project through slots 60 in the spindle housing.

In operation the overload release clutch 46 is released on the application of a predetermined overload corresponding to the tension of spring 49. This tension is varied and determined by rotating the torque release adjusting sleeve 54. This increases or decreases the compression of said spring by raising or lowering thrust bearing 53 by operation of threads 57.

It is further of importance that resulting from the movement of the clutch member 47 on spindle 40 any vibration due to the operation of the clutch member 47 is taken up by the spring 49 and distributed to the frame or casing which absorbs such vibrations of the clutch member without itself being subject to vibration.

I have thus described specifically and in detail two forms of portable power driven rotary tool for driving screws, running nuts and the like, having an overload release comprising a clutch which opens against a resilient member having a stationary support on the frame so that the frame absorbs the vibration and the tool operates without transmitting vibration to the hands of the operator, also I have provided means whereby the clutch is conveniently adjustable as to the torque of release, and the disclosure also includes a further embodiment of the invention having a clutch which operates both as a dead spindle clutch and as an overload release, the vibration of the clutch in the overload release being taken up by the frame and absorbed thereby without vibration of the frame or casing, the construction preferably including balanced springs for the control of both types of release and an adjustment for the balanced springs which changes the torque of release without interfering with the balance, the description of these embodiments of the invention being specific and in detail in order that the manner of constructing, applying, operating, and using the invention may be fully understood, however, the specific terms herein are used descriptively rather than in a limiting sense, the scope of the invention being defined in the claims.

What I claim as new and desire to secure by Letters Patent is:

1. In a manually portable power driven rotary tool a spindle mounted to slide in the direction of its length, an overload releasing clutch, one member of said clutch being driven from the source of power, the other clutch member being mounted to slide relatively to the spindle and also with the spindle and balanced springs controlling said clutch, one spring being connected to advance the spindle to hold the clutch normally disengaged, the other spring being connected to control the sliding clutch member tending to hold it in engagement and operating to permit a releasing motion, along the spindle, of the said clutch member in yielding to the releasing pressure of an overload and means for adjusting the springs simultaneously.

2. A tool as per claim 1 in which there is a movable abutment for each spring, said adjusting means being adapted to move the abutments oppositely, at equal speeds to maintain the balance of the springs.

3. In a manually portable power driven rotary tool an overload releasing toothed clutch, also serving as a dead spindle clutch, some of the engaging surfaces of the teeth being inclined the clutch comprising two clutch members, one said member being mounted to move in the direction of its axis and balanced opposed springs one spring applying an opening tendency to said clutch, whereby it is normally released, but is engaged by the thrust of the tool against the work, the other spring tending to close the clutch and being of such tension as to permit the clutch to release on the predetermined overload, a spindle, an abutment for each said spring by which tension is applied to the corresponding spring, a casing for the tool enclosing the spindle and springs and extending substantially the entire length of the spindle, a sleeve rotatively mounted on said casing intermediately of the length of the casing enclosing the portion of the casing containing the abutments, the sleeve having a screw engagement with the casing and with the abutment for the spring which applies an opening tendency to the clutch, the sleeve also having a support for the other abutment, both abutments having a sliding engagement with the casing to prevent them from rotating.

4. A manually portable power driven rotary tool for use in driving screws, running nuts and the like, having a slidably mounted spindle an overload releasing clutch with two clutch members, having teeth with inclined engaging surfaces said clutch also serving as a dead spindle clutch, one member being connected to the source of power to be driven thereby, the other member being mounted to slide in the direction of the spindle axis, two resilient members, an abutment which in the operation of the tool bears a fixed relation to said driving clutch member said abutment supporting one said resilient member oppositely to said sliding clutch member holding it in driving engagement with the driven clutch member when it is in engagement, an abutment for the other resilient member which resilient member is engaged at its opposite end with said spindle whereby it tends to slide the spindle, holding the sliding clutch member normally out of engagement with the driven clutch member, the tension of said latter resilient member being overcome by the pressure of the tool against the work causing the clutch to engage, the first mentioned resilient member being adapted to yield at a predetermined overload permitting the clutch to disengage.

5. A manually portable power driven rotary tool, as defined in claim 4, in which there is a tool casing and an adjusting mechanism consisting of an adjusting carrier for said abutments having a threaded engagement with the tool casing and a threaded engagement with one said abutment, the threads being inclined in the same direction and one thread having twice the pitch of the other thread, the other abutment being stationary relatively to said carrier.

6. In a manually portable power driven rotary tool, an overload releasing clutch having teeth with inclined engaging surfaces the clutch comprising a power driven clutch member, a spindle, a clutch member mounted to slide on the spindle into and out of engagement with said driven clutch member, a resilient member tending to hold the clutch in engagement when the tool is in operative engagement with the work but adapted to yield at a predetermined overload, a spindle housing, a sleeve mounted on the latter housing, and having an abutment for engagement by said resilient member oppositely to the moving clutch member, the sleeve being adjustable along the spindle housing to move said abutment in the direction of the spindle axis and vary the tension of the resilient member, the spindle being mounted to slide and the tool having a second resilient member arranged to give a normal release, said sleeve having an abutment for the second resilient member and thus serving as a single adjusting means for adjusting the tension of both resilient members simultaneously to determine the torque at which the overload release takes place.

7. In a manually portable power driven rotary tool, a shaft extending in the direction of the tool axis and mounted to slide in said direction, a single clutch having inclined engaging surfaces serving both as a dead spindle and an overload releasing clutch, one clutch member being mounted to slide along the shaft in an axial direction, an overload release resilient member and a dead spindle resilient member, said resilient members being opposed and balanced, an abutment engaged by the dead spindle resilient member which resilient member also engages said shaft oppositely to said abutment tending to slide the shaft and open the clutch holding it normally released to be engaged by the thrust of the tool against the work, the overload releasing resilient member being arranged to slide said clutch member along the shaft in the direction of engagement, the overload release resilient member being distorted permitting the clutch to release on the application of a predetermined overload, a casing enclosing the tool and extending substantially the entire length of the spindle, said abutment being mounted on the casing whereby the vibratory action of the spindle and clutch are transferred to the casing by the resilient members and thus substantially absorbed protecting the hands of the operator, said tool also having an abutment opposed to the sliding clutch member to support the overload releasing resilient member, and an adjustment for both abutments for moving them oppositely at equal speeds and simultaneously.

HAROLD O. SHORT.